United States Patent

[11] 3,601,670

[72] Inventors Lars Goran Eriksson;
Karl-Gunnar Goliath; Bo Ingemar Larsson,
all of Vasteras, Sweden
[21] Appl. No. 30,095
[22] Filed Apr. 20, 1970
[45] Patented Aug. 24, 1971
[73] Assignee Allmanna Svenska Elektriska Aktiebolaget
Vasteras, Sweden
[32] Priority Apr. 22, 1969
[33] Sweden
[31] 5650/69

[54] PLURAL MOTOR DRIVING SYSTEM ADAPTED FOR REGENERATIVE BRAKING
1 Claim, 2 Drawing Figs.
[52] U.S. Cl........................................ 318/87,
318/112, 318/376, 318/527
[51] Int. Cl........................................ H02p 7/70
[50] Field of Search........................................ 318/49, 81,
84, 86, 87, 89, 112, 376, 378, 527, 528

[56] References Cited
UNITED STATES PATENTS
1,726,276 8/1929 Osborne...................... 318/87
3,069,606 12/1962 Pastoret et al................ 318/81 X Primary Examiner—Oris L. Rader
Assistant Examiner—H. Huberfeld
Attorney—Jennings Bailey, Jr.

ABSTRACT: A driving system adapted for regenerative braking having two DC motors each having two series wound field windings. The motors and one field winding from each motor are connected in a bridge circuit to a DC source to provide for changing from motor to generator conditions. The other two field windings are connected in series with each other and with the DC source in a diagonal of the bridge. The motors are controlled in response to the average value of motor current.

PLURAL MOTOR DRIVING SYSTEM ADAPTED FOR REGENERATIVE BRAKING

BACKGROUND OF THE INVENTION

1. Field of the Invention

The present invention relates to a driving system adapted for regenerative braking, comprising a plurality of DC series machines which, both during operation and braking, are distributed in a plurality of parallel groups included in a circuit connected to a DC source, such a circuit being connected to the current source during braking by means of a rectifier and arranged in such a way that it can be short-circuited pulsewise by means of a periodically operating electric switching device, the length and/or frequency of the short-circuiting interval being regulated in dependence on the average value of the total machine current.

2. The Prior Art

It is known, for instance through the French patent No. 1,337,643, to regulate the power from a parallel-connected group of DC series machines to a DC network by series-connecting the group with a resistor and connecting the series group thus obtained to the network over a rectifier and to provide the series group with a parallel-connected short-circuiting circuit which includes an electric switching device intended to close and open periodically the shortcircuiting circuit, whereby the length and/or frequency of the short-circuiting interval is controlled in dependence on the average value of the machine current. Each time a short-circuiting interval is finished, the current continues to flow with unaltered direction through the series machines, but to the network instead of through the short-circuiting circuit, and the e.m.f. required for this is generated in said series group through self-induction. In the regenerative interval there is no need of the generator voltage generated in the normal way in the machines. On the contrary, it is an advantage if this is as insignificant as possible. It is most important that the voltage generated in this series group does not become noticeably higher than the network voltage, which would cause impermissibly great current strength in the machines. The above-mentioned resistor which is included in the series group has the task of limiting the generator voltage developed in the series group so that regenerative braking can be effected even at high speed, but this means that a considerable portion of the braking energy is wasted. In a driving system according to the invention, this disadvantage is avoided since only one part of the field winding is used for generator operation.

When parallel-connected series motors or parallel-connected series groups of such motors are to be driven as generators with the object of effecting regenerative braking, complicated connecting operations are required. First of all, the terminals must be interchanged on the field winding or the armature winding. Furthermore, steps must be taken to ensure even load distribution upon generator operation, for example cross-connection so that the field windings of one parallel group have current flowing through them from the other parallel group.

SUMMARY OF THE INVENTION

The DC machines according to the invention are provided with two series windings each. During braking only one series winding from each machine is then used and during driving the other is also used. Thus, in addition to the requirements mentioned above, there is also a need to be able to vary the cooperation between the various parts of the field windings by means of connecting operations, corresponding to the need for regrouping upon transition from driving to braking. However, since the different components of the equipment are arranged in a bridge connection in a special manner, the required connecting operations are performable with a minimum of connecting devices.

A driving system according to the invention is characterized in that the machines are provided individually with a first and a second series winding and that their rotors are evenly distributed on two opposite sides of a four-sided bridge, and said first series windings are evenly distributed on the other sides of the bridge, and that the current source by means of switching means is connectable in a first diagonal of the bridge during operation and in a second diagonal during braking, whereas said second series windings are always included in said first diagonal.

BRIEF DESCRIPTION OF THE DRAWINGS

The invention will be described in the following with reference to the accompanying schematical drawings in which the embodiment shown in FIG. 1 illustrates the main principle of the invention

DESCRIPTION OF THE PREFERRED EMBODIMENTS

Figure 1:
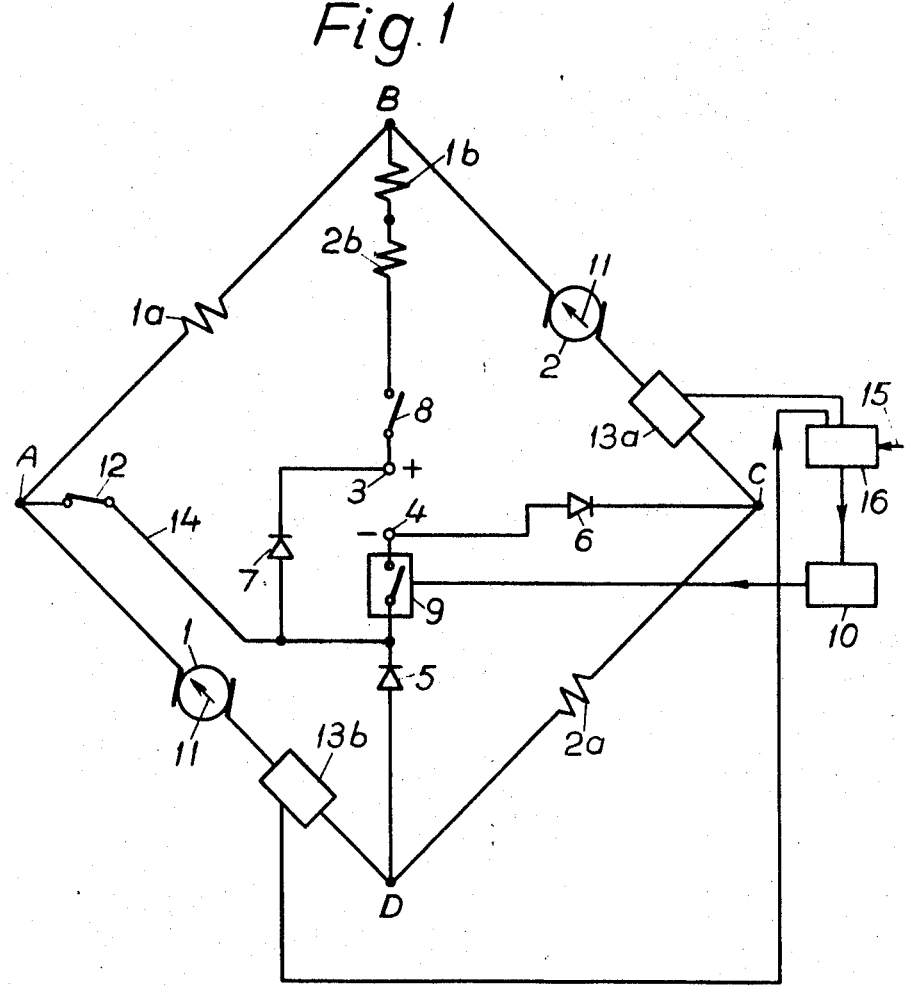

In FIG. 1, 1 an 2 designate the rotors in two DC series machines which are provided with two field windings each. The two field windings belonging to the rotor 1 are designated $1a$ an $1b$ and those included in the same machine as the rotor 2 are designated $2a$ and $2b$. The terminals of a DC source for the driving system are designated 3 and 4. The arrangement includes a rectifier 5 intended to conduct current when the DC machines are driven as motors, and two rectifiers 6 and 7 intend to conduct current during regenerative braking. Furthermore, the driving means includes a circuit breaker 8 intended to be closed during motor operation and open during generator operation of the DC machines, and a circuit breaker 12 intended to be closed only during generator operation. Nine is an electric switching device intended to break and close alternately at a high rate. Its frequency and the length of the various intervals are regulated by means of the control device 10 which is supplied with the difference between a reference value 15 and the sum of the output values from the current emitters $13a$ and $13b$ connected in the rotor circuits, through a comparison device 16. Switching device 9 is thus controlled in response to variations in a variable of the circuit. During motor operation the series group $2,2a$ is parallel-connected with the series group $1,1a$. During generator operation the series group 1, $2a$ is parallel-connected with the series group $2,2b$.

The direction of rotation and also the induced electromotoric power of the DC machines remain unaltered upon switching over from motor operation to braking, but the rotor current on the other hand changes direction. It is therefore necessary that the field winding, upon switching over between motor operation and braking, be arranged in such a way in relation to the rotor winding that altered current direction in the latter does not cause an alteration in the direction of the excitation flux. As is clear from the drawings, this is achieved in the arrangement shown. The arrows 11 indicate the direction of the above-mentioned electromotoric power and in the rectifiers 5,6,7 the current direction is indicated in the drawing by the arrowlike part of the graphic symbols.

The various components of the device are connected together in a four-branch bridge and each branch is shown in the drawing as a side of a rectangle. The rotors 1 and 2 are included one in each of two opposite sides and the field windings $2a$ and $2b$ one in each of the other sides of the rectangle in such a way that the two motors are parallel-connected across the diagonal BD, only windings belonging to one and the same motor being connected in each parallel circuit, whereas each of the two parallel-connected circuits which are connected between the diagonal end points A and C include a rotor and a series winding belonging to separate machines. When the latter parallel-connection is used a so-called "cross-connection" is obtained, which is a well-known precaution to ensure an even load distribution upon parallel-connection of two series generators.

During motor operation the total current delivered to the driving means from the terminal 3 flows over the breaker 8 through the two field windings 1b and 2b and divides in the diagonal end point B into two parallel circuits, one of which consists of the rotor 2 and its field winding 2a whereas the other consists of the rotor 1 and field winding 1a. From the diagonal end point D the total current is conducted through the current converter 5 and electric switching device 9 to the negative terminal 4 of the current source, in an interval when the electric switching device continues to flow for a short while to the autoinduction in the windings of the machine and is closed through the connection 14 and current converter 7. The average value of the motor current is determined by the value set by the reference value device 15.

Upon switching over to braking the breaker 8 is opened, as mentioned, and the breaker 12 is closed. Because of the remanence in the field windings 1a and 2a, a generator voltage is generated, the direction of this voltage still coinciding with the direction of the arrows 11. If the electric switching device 9 is closed, therefore, a short-circuiting current arises in each of the two-parallel-connected machine circuits. One of these short-circuiting currents flows from the rotor 1, through the breaker 12, communication 14, electric switching device 9, current converter 6 and field winding 2a back to the rotor 1. The other short-circuiting current flows from the rotor 2 through the field winding 1a, breaker 12, connection 14, electric switching device 9, current converter 6 and back to the rotor 2. When the electric switching device 9 is opened, the current flows with the same direction through the rotors 1 and 2 and the field windings 1a and 2a and is now fed in to the terminals 3 and 4 of the direct current source, while an e.m.f. exceeding the voltage of the direct current source is generated substantially by means of self-induction in the field windings 1a and 2a, these having so few turns that their excitation flux—even at the highest possible speed—is only able to generate generator voltage which is considerably below the voltage of the DC source. The average value of the machine current is determined by the magnitude of the reference value furnished at 15 and in such a way that the machines are not over loaded.

Figure 2:
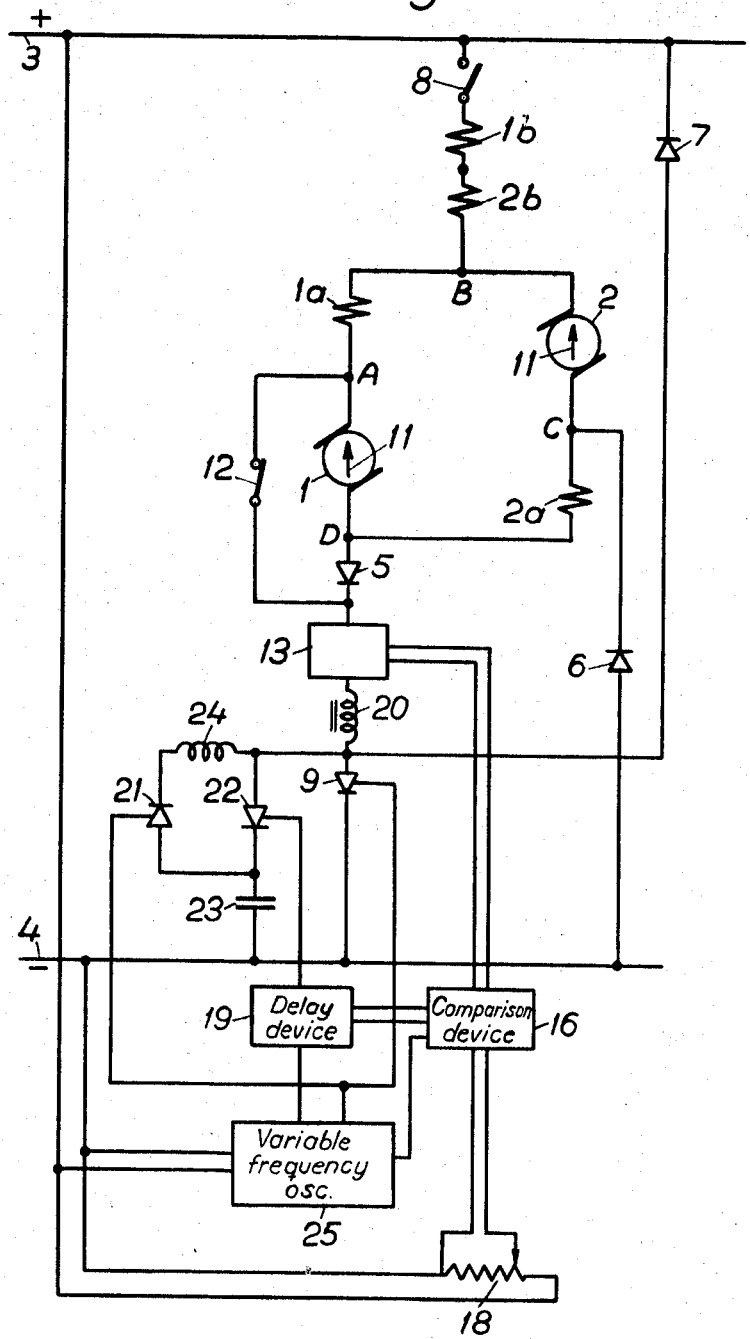
FIG. 2 shows a driving system according to the invention provided with control means intended to control the driving torque and the braking in an electric vehicle.

In the embodiment of the invention shown in FIG. 2, the electric switching device 9 consists of a thyristor which is provided with equipment, known per se, for rapidly alternating ignition and extinction. Furthermore, FIG. 2 differs from FIG. 1 in that a reactor 20 is included in the driving system. The designations used in FIG. 1 are also used in FIG. 2 and have the same meaning. The breakers 8 and 12 are shown in position for regenerative braking. The thyristor 9 must be currentless for about 20 $\mu$ sec. if it is to be able to block after having been conducting.

This is made possible with the help of a circuit containing two thyristors 21 and 22, a capacitor 23 and a reactor 24. The thyristors 9 and 21 are given ignition impulses simultaneously, whereby the capacitor 23, which has positive voltage in relation to the bar 4, discharges in the form of a current through thyristor 21, reactor 24 and thyristor 9. The sinusoidal current which thus arises on the oscillating circuit formed by the reactor 24 and the capacitor 23 dies out only after the first half period, since the thyristors 21 and 9 do not permit this current to change direction. The capacitor 23 will, during the course of this half-period, be charged to opposite polarity. The thyristor 22 receives its ignition impulse somewhat later than the thyristors 21 and 9, and, when this occurs, the capacitor 23 will once again be recharged so that it acquires its original polarity. The capacitor 23 is thus parallel-connected over the thyristor 22 with the thyristor 9 which thus receives blocking voltage. The magnetic energy which is stored in the system is discharged by current being fed into the bar 3 through the diode 7.

The thyristors 9, 21 an 22 receive their ignition impulses from an oscillator 25 having variable frequency. The pulse length of the thyristor 9 is controlled by the ignition impulse for the thyristor 22 passing the delay means 19, the delay being dependent on the control magnitude delivered from the comparison device 16. The desired average value of the machine current is set by means of the reference value device 18.

The oscillator 25 and the delay device 19 may be of any known design, for example in accordance with FIGS. 3 and 4, respectively of Persson Pat. application S.N. 787,180, filed Dec. 26, 1968.

The current transducer 13 may quite simply consist of a series-connected resistor in the same way as the item 6 in the drawing in Swiss specification No 477,306, and the comparison device 16 may then in its most simple form consist of a connecting device for series connecting the output voltages from the devices 13 and 16 in opposition to each other, the device being furnished with output terminals for the resultant voltage.

We claim:

1. Driving system of regenerative braking comprising a bridge circuit having first, second, third and fourth sides (AB, BC, CD, DA) and first and second diagonals (AC BD), the first and third sides being opposite each other, two DC series machines having their rotors (1,2) connected in the second and fourth sides, respectively, each machine having first and second field windings (1a, 1b, 2a, 2b), the first field windings (1a,2a) being connected in the first and third sides, respectively, a current source (3,4) switching means (8,12) for connecting said current source in the second diagonal during motor operation and in the first diagonal during braking, the second field windings being connected in the second diagonal, rectifier means (6,7) in each of said diagonals, a periodically operating switching device (9) for short-circuiting said rectifier means, and means (10) responsive to variations in a variable of said circuit to control the operation of said switching device.